Sept. 20, 1971  B. MILLER  3,605,580
MOBILE EXTRUDER FOR FORMING STREET CURBS
Filed June 26, 1969  3 Sheets-Sheet 3
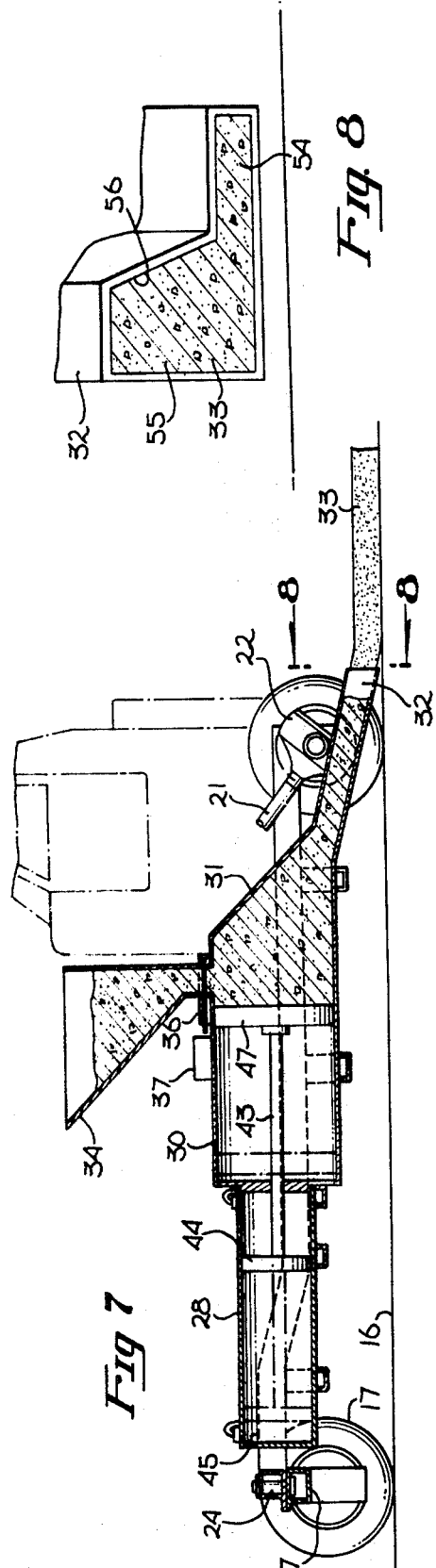
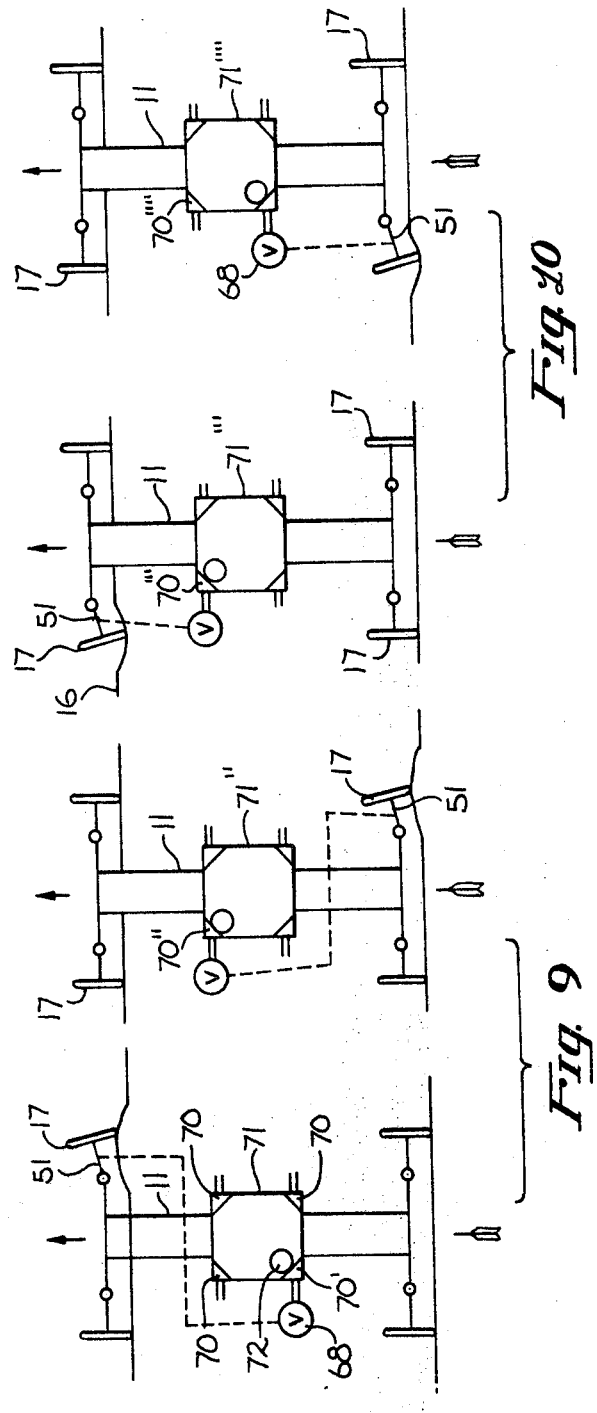
BERNARD MILLER
INVENTOR.
BY United States Patent Office 3,605,580
Patented Sept. 20, 1971

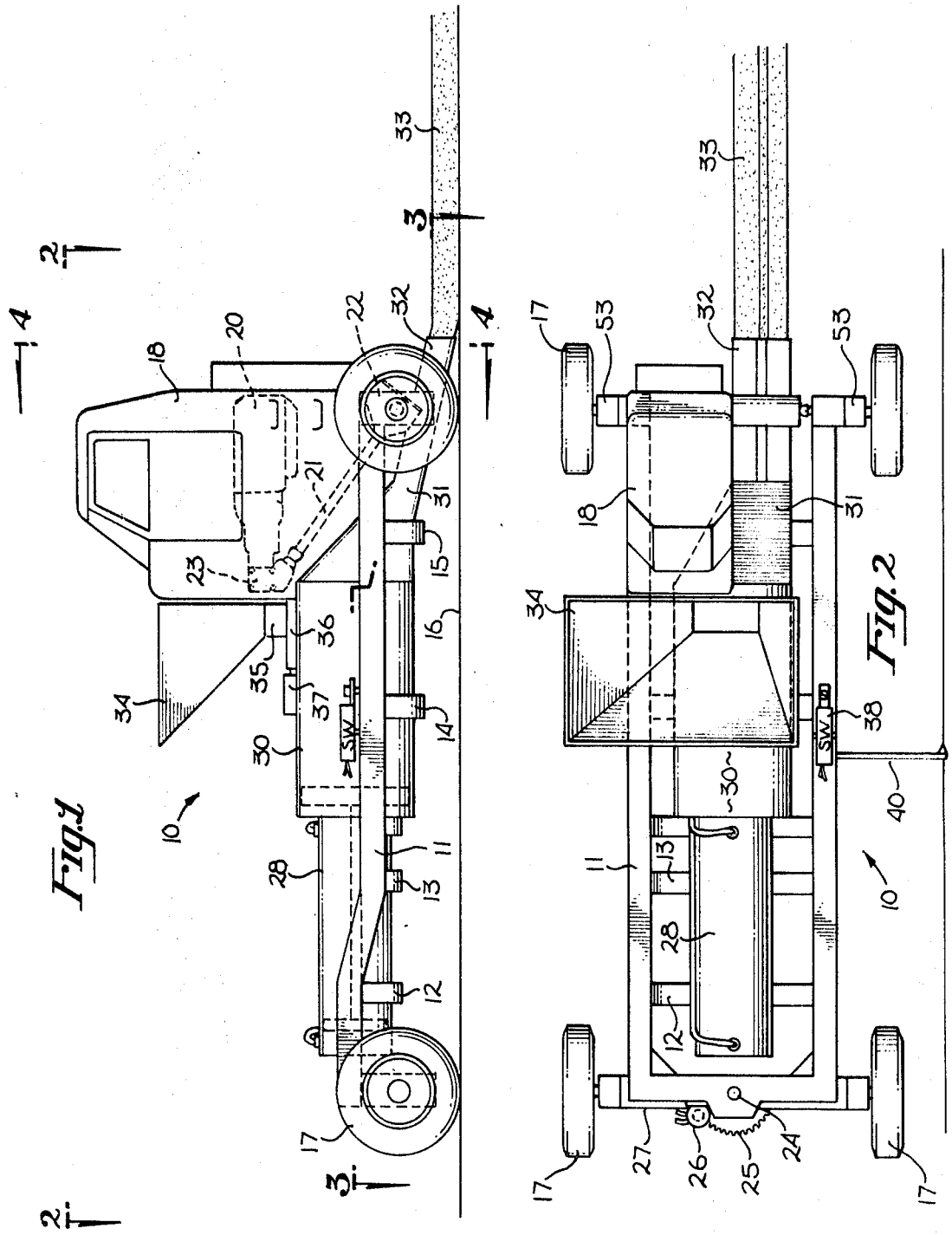

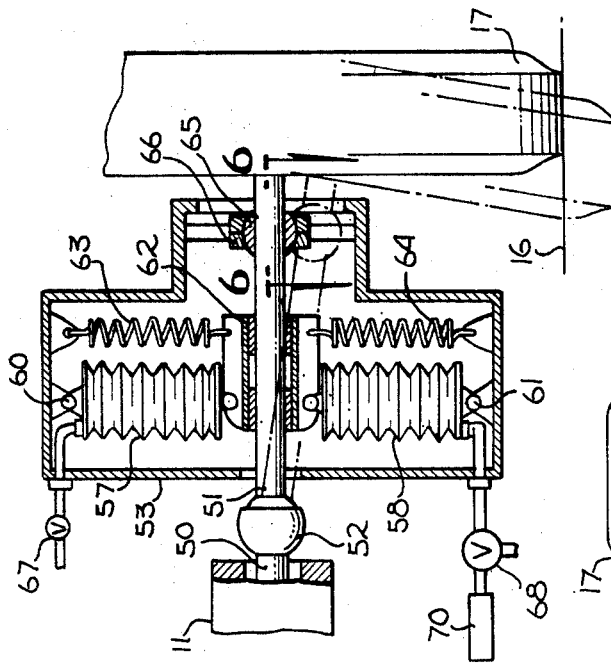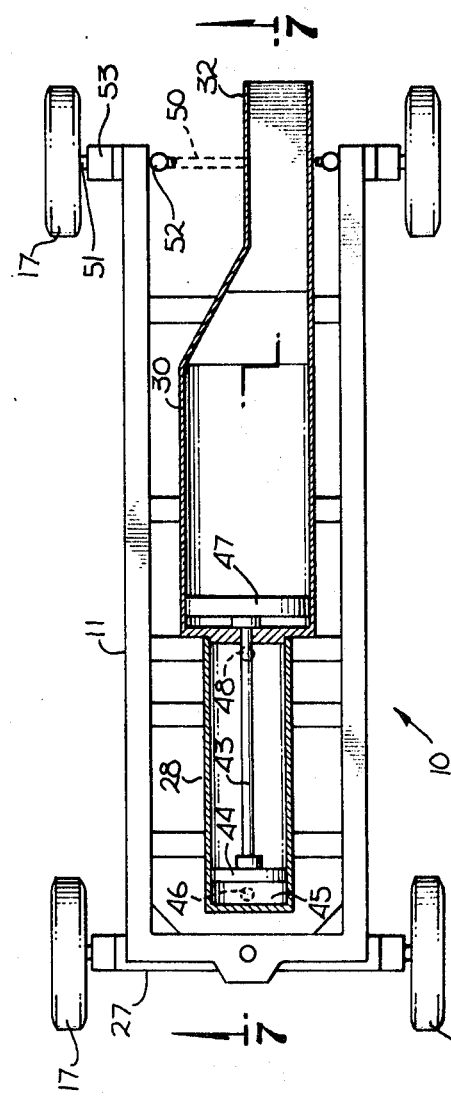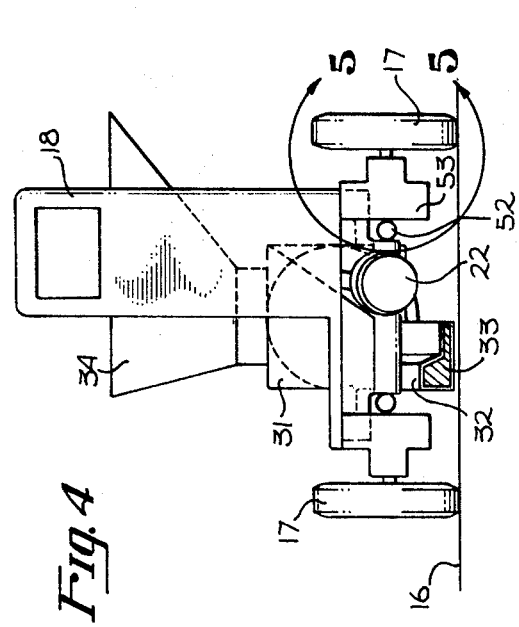

3,605,580
MOBILE EXTRUDER FOR FORMING STREET CURBS
Bernard Miller, 1663 Veteran Ave.,
Los Angeles, Calif. 90024
Filed June 26, 1969, Ser. No. 836,764
Int. Cl. E01c *19/48*
U.S. Cl. 94—46                                                                 8 Claims

ABSTRACT OF THE DISCLOSURE

A mobile extruder is disclosed herein for laying a continuous strip of concrete or cement product in the shape of a curb onto a street surface. Self-leveling mechanism is carried on the extruder maintaining the extruding orifice level with respect to the street surface and sensing devices are incorporated into the mechanism for detecting non-level surface conditions and for actuating the mechanism to compensate for such conditions.

BACKGROUND OF THE INVENTION

(1) Field of the invention

This invention relates to extruding devices for use in the construction industry and, more particularly, to a novel self-propelled and stabilized extruder for forcibly urging a fluid building material through an L-shaped orifice onto a street surface to form a siding or curb.

(2) Description of the prior art

Man's improved technology has wrought tremendous advances in many fields, but little has been done in the construction field for automatically handling a building product such as concrete or cement in a manner so as to preform and discharge a continuous formed product such as a siding or curb. Street curbs are presently constructed by conventional methods involving construction forms and to standards which have been in use for many years. For this reason, a tremendous amount of expense and labor goes into the creation of street curbing whether it be on commercial roadways or residential streets. Improvement in construction techniques which are permitted by modern technological approach and conceptual improvement can readily reduce the cost of such structures and make them more durable by the use of automatic equipment and related accessories which readily accept raw building materials, form the materials and dispense the formed material to create a construction product such as a curb, siding, fence, barrier or the like.

A major deterrent to the employment of mechanized or automated equipment in the construction field resides in the fact that streets are seldom level and discharge of concrete or cement from a conventional mixer, for example, does not provide sufficient compaction of the product to allow immediate curing in situ. Consequently, a multiplicity of equipment is necessary to mix the building product, pour the product into containers which are moved to the street site where hand labor transfers the raw product to installed forms where the product is then compacted and cured in the shape of the forms. A particular problem resides in providing curbs which will interrupt their continuity so as to provide driveways and other access accommodations at the street level. Obviously, the use of such conventional equipment and extensiveness of labor are undesirable from an economic and construction time viewpoint.

SUMMARY OF THE INVENTION

Accordingly, the difficulties and problems encountered with conventional building construction are obviated by the present invention which provides a self-propelled and mobile extruder adapted to be moved at a predetermined speed along the edge of a street so as to lay a continuous strip of curbing therebehind. The extruder includes a frame for mounting an extruding device for forcibly urging a prepared building product, such as concrete or cement, through a shaped orifice so as to discharge a continuous and a compacted product therefrom directly onto the edge of the street or roadway. The frame is carried on a set of wheels which rollably engage the street. A self-leveling mechanism is mounted on the frame and is interconnected to the wheel axles so that as the wheels encounter depressions or inclines in the street surface, sensing means incorporated into the mechanism detect the change and independently adjust the frame via the axles whereby the extruding orifice is maintained level with respect to the street surface.

In one form of the invention, the self-leveling mechanism may include axle portions which are pivotally related with respect to the frame and are positionable by means of a pressurized bellows means so as to permit vertical pivoting of the wheel axle portions in response to actuation by the sensing means.

The sensing means may take the form of a gravity device wherein a change of extruder frame attitude energizes the sensing means so as to control the self-leveling mechanism and hence, the independent actuation of the wheel axle portions.

Therefore, it is among the primary objects of the present invention to provide a novel mobile extruder for use in the building industry adapted to forcibly urge a building product material through a shaped orifice in the form of a roadway siding or curb.

Another object of the present invention is to provide a novel mobile extruder having self-leveling means and sensing means for detecting street irregularities while an extruded building material product is discharged in the form of a street curbing.

Another object of the present invention is to provide a novel means for leveling a mobile extruder during its operation which takes the form of gravity sensing means and an axle mechanism employing bellows pressure devices.

Still another object of the present invention is to provide a novel self-propelled extruder for the construction industry which eliminates the necessity of using building forms and extensive labor in the construction of roadway barriers, curbs, fences or the like.

Still another object of the present invention is to provide a novel self-leveling means for maintaining a mobile extruder level with the surface of a street while a curb-shaped building product is being dispensed therefrom which incorporates pivoting axles and a pressurized bellows system for actuation of the axles in response to detection of uneven street surface conditions.

BRIEF DESCRIPTION OF THE DRAWINGS

The features of the present invention which are believed to be novel are set forth with particularly in the appended claims. The present invention, both as to its organization and manner of operation, together with further objects and advantages thereof, may best be understood by reference to the following description, taken in connection with the accompanying drawings, in which:

FIG. 1 is a side elevational view of the novel extruder of the present invention illustrating a building product material being laid on a street surface in the form of an extruded street curb;

FIG. 2 is a top plan view of the extruder shown in FIG. 1 as taken in the direction of arrows 2—2 thereof;

FIG. 3 is a longitudinal cross-sectional view of the extruder as taken in the direction of arrows 3—3 of FIG. 1;

FIG. 4 is a rear end elevational view of the extruder as taken in the direction of arrows 4—4 of FIG. 1;

FIG. 5 is an enlarged sectional view of the wheel axle area encircled by the arrows 5—5 in FIG. 4 showing the bellows pressure devices incorporated in the self-leveling mechanism;

FIG. 6 is a cross-sectional view of the wheel axle shown in FIG. 5 as taken in the direction of arrows 6—6 thereof;

FIG. 7 is a longitudinal cross-sectional view of the extruder shown in FIG. 3 as taken in the direction of arrows 7—7 thereof;

FIG. 8 is an enlarged sectional view of the extruder orifice taken in the direction of arrows 8—8 of FIG. 7; and FIGS. 9 and 10 are diagrammatic views of the surface sensing means employed in the self-leveling mechanism for maintaining the extruder level with respect to the street surface.

DESCRIPTION OF THE PREFERRED EMBODIMENT

Referring now to FIGS. 1 and 2, the novel mobile extruder of the present invention is illustrated in the direction of arrow 10 which includes a rectangular frame 11 having a plurality of transverse cross members 12–15 for supporting the various mechanisms and equipments. The frame is movably supported on a street surface 16 by a plurality of wheels 17 located in pairs at the front and rear of the frame. Preferably, the frame supports a cab 18 for housing the driver and the necessary controls for operating the vehicle. A suitable engine 20 is carried beneath the cab and a drive shaft 21 is operably connected to the rear wheels via a differential mechanism 22. The shaft is operably connected to the engine via a suitable transmission 23 to complete the drive train.

Steering of the mobile extruder is achieved by pivotally mounting the front pair of wheels to the frame via a pivot pin 24 which carries a semi-circular gear 25 thereon. The gear 25 is driven by means of a steering pinion 26 which is under control of the driver and may be included in a conventional power steering system. It is to be noted that the forward pair of wheels are carried on a separate axle arrangement 27 from the frame 11 so that the member may pivot as the gear 25 is driven by pinion 26.

Supported on transverse cross members 12–15, there is suitably mounted an extruding mechanism which comprises a piston and cylinder assembly 28, a compaction chamber 30 and a discharge chamber 31 having an open extruding discharge end or orifice 32 for dispensing a continuous strip 33 of building product in the form of a curb. The building product material may be of any suitable character but preferably will be composed of concrete, cement or asphalt. A hopper 34 is mounted on the compaction chamber 30 adjacent cab 18 which receives raw building product material and gravity feeds the material into the compaction chamber via an outlet 35 in fluid communication with the interior of the chamber 30. A closure mechanism is provided on the exterior of the chamber which includes a slidable member 36 and an actuator 37 so that communication between the hopper 34 and the chamber 30 may be selectively interrupted whereby a predetermined amount of the building material or product in the hopper may be introduced to the chamber interior.

Means are provided for referencing the vehicle with the edge of the street so that the vehicle will travel in a straight parallel path therewith. This latter means includes a microswitch 38 operably connected to the power steering mechanims and further includes an arm 40 having a guide 41 located on its free end for alignment with the edge 42 of the street 16.

Referring now to FIG. 3, the piston and cylinder assemblage includes a cylindrical cylinder housing a piston which comprises a rod 43 having a disc 44 secured at one end so as to define a pressure chamber 45 in cooperation with the end of the cylinder. An inlet 46 is in fluid communication with the chamber 45 so as to provide a source of pressurized pneumatic force behind the disc 44 so as to urge the disc and rod 43 through the cylinder. The opposite end of rod 43 from its end carrying disc 44 is fixed with a ram piston 47 that is situated within interior of compaction chamber 30. An exhaust outlet or orifice 48 is in fluid communication with the cylinder and is included in the pneumatic system so as to exhaust air from the cylinder which is ahead of the disc 44 as the disc 44 moves along the length the cylinder. Preferably, the pneumatic system is balanced so that as pressure increases in chamber 45, the disc 44 will move in the direction of chamber 30 and the air ahead of the disc will be exhausted through the orifice 48. In reverse, the disc 44 may be moved toward the forward end of the vehicle by pressurizing the side of the disc 44 facing orifice 48 and exhausting chamber 45 through inlet 46. This action will reverse the rectilinear movement and direction of ram 47 so that it will retract to the position shown in solid lines within chamber 30.

The end of compaction chamber 30 opposite to its end slidably carrying rod 43 is in fluid communication with the discharge chamber 31. It is noted that the discharge chamber increases compaction of the building product material introduced thereto from chamber 30 via reduced volume within the chamber effected by the sloping sides of the chamber entrance which taper towards the discharge orifice 32.

A self-leveling mechanism is provided which includes an axle 50 for each of the forward and rear pairs of wheels 17 which is suitably rotatably carried on each end of the frame 11 and each axle includes an outward axle section 51 which is pivotally carried on the opposite ends of main axle 50 by means of a universal coupling 52. Each axle section 51 is adapted to move in an up-and-down vertical direction by means of a control mechanism 53 carried on the pivotal axle section 51. The control means 53 will be described later.

Referring now in detail to FIG. 7, suitable building material or product such as cement or concrete is poured into the hopper 34 where the material is gravity fed through the opened passageway of the closure mechanism 36 into the compaction chamber 30. The chamber 45 is pneumatically pressurized so as to forcibly urge the piston 47 to travel through the compaction chamber from its position shown in broken lines to its advanced position shown in solid lines. As the piston 47 advances, the material ahead of the piston is compacted and forcibly urged into the dispensing or discharge chamber 31. Since the volume of the discharge chamber is gradually reduced due to the declining surfaces of the chamber walls, the product is further compacted and forcibly urged through the discharge orifice 32 in a continuous strip 33. The material as discharged assumes the configuration of the discharged orifice which is substantially L-shaped so as to constitute a preformed curb. The material may be allowed to cure in ambient temperature. Should it be desired to change the shape or configuration of the curb such as to provide a driveway entrance leading to the street surface, workmen may readily reform the continuous strip as it is discharged to the desired slope or configuration.

Upon the furthermost advancement of piston 47, substantially all of the material in the compaction chamber will have been forced into the discharge chamber and during its advancement, the closure means 36 is closed so that the material cannot be force back into the hopper. One-half cycle is complete when the piston has advanced to the discharge chamber. The second half of the cycle is effected by retracting the piston 47 so that the closure means may be opened to introduce additional building product material into the compaction chamber. This is achieved as previously described by exhausting chamber 45 and introducing a pressurized pneumatic force between the disc 44 and the end of the cylinder slidably carrying rod 43.

However, it is to be understood that other building product material moving and compaction means may be employed. For example, the piston and cylinder assemblage may be replaced by a lead screw mechanism which, upon rotation within the compaction chamber, will transfer the building product from the compaction chamber into the discharge chamber. Additionally, a second piston and cylinder assemblage may be readily installed with a common discharge chamber 31 operating on a different cycling basis than the first piston and cylinder assemblage. When the first piston and cylinder assemblage is advancing its piston to effect discharge of the product, the second piston and cylinder assemblage may be retracting its piston and simultaneously, additional building product is being introduced to the compaction chamber of the second assemblage. Therefore, a tandem operation is produced which insures a continuous discharge of the product so that the vehicle need not stop during recharging of the compaction chamber with building product material.

Also, it is to be understood that a vibration means may be incorporated into the piston and cylinder assemblage and the compaction chamber to assist the flow of material therethrough. Various hatches and covers may be operably included in the assemblage and chambers to permit ready access to the interior thereof for maintenance, repair and cleaning purposes.

In FIG. 8, the discharge orifice 32 of the discharge chamber 31 is configured in cross section to correspond substantially to the shape of a standard curb. The overall configuration of the orifice is substantially L-shaped and includes a base portion 54 intended to lie on the edge of the street and an upright portion 55 having a downwardly sloping side 56 intended to represent the curb.

Referring now to FIGS. 4, 5 and 6, self-leveling mechanism is illustrated for selectively moving each of the individual axle sections up or down depending upon encounter of the wheels with depressions or elevations in the street surface. One form of the self-leveling mechanism includes a control means having pneumatically operated bellows for controlling the vertical movement or pivoting movement of the axle section 51 with respect to the axle portion 50. As illustrated in FIG. 5, a pair of pneumatic bellows 57 and 58 are disposed on opposite sides of the axle and each of the bellows are pivotally fixed at their ends farthest away from the axle section to a housing by conventional pivot connections 60 and 61, respectively. The opposite end of each of the bellows is pivotally coupled to opposite flanges of a sleeve 62 surrounding the midsection of the axle section 51. The inner diameter of the sleeve 62 includes a pair of bearings for rotatably accommodating the axle section. Normally, both bellows are supplied with sufficient air to cause expansion so that a balanced force is applied to the axle section whereby the axle section will lie on the central longitudinal axis of the main axle 50. Operating against the expansive force of each of the bellows, there is provided a pair of springs 63 and 64 having their opposite ends connected between the flange of sleeve 62 and the opposing end of the housing of the bellows. Each of the springs are compressive in tension and bias the axle in either the up or down direction depending upon the pressure in the respective bellows 57 and 58. For example, when the pressure in bellows 57 is reduced, the compressive tension of spring 63 will bias the axle section 51 upwardly within the pivot joint 52. On the other hand, when bellows 57 is fully pressurized and the pressure within bellows 58 is reduced, spring 64 will cause the axle to pivot downwardly. Additionally, the fact that bellows 57 is pressurized while bellows 58 is reduced in pressure further biases the axle in the direction of the bellows with the reduced pressure. Therefore, it can be seen that a balanced and stabilized support means for the pivotal axle section 51 is provided and that the system can be readily unbalanced by relieving pressure in a selected one of the bellows to effect pivoting of the axle section for a given wheel.

To further stabilize and support the axle during pivoting and to insure that only a vertical movement of the axle is provide, a universal joint 65 is included and is adapted to vertically move with the pivoting action of the axle section 51. The up-and-down movement of the universal joint 65 is achieved as seen in FIG. 6 wherein the joint 65 is carried on a member 66 adapted to slide in tongue-in-groove arrangements 59 and 69 with respect to the housing.

As shown in solid lines in FIG. 5, the axle section 51 is lying substantially on the central longitudinal axis of the fixed axle 50 while a downwardly pivoting showing of the axle section 51 is seen in broken lines when the bellows 58 is in its relaxed condition and bellows 57 is in its pressurized condition.

Air supplied to the bellows is under the control of solenoid operated check valves 67 and 68 for the bellows 57 and 58, respectively. Each of the solenoid operated check valves are, in turn, connected to a suitable source of pneumatic pressure (not shown) which may be carried on the frame 11. Operation of the check valve for introducing pressurized air to the bellows or for relieving pressure from the bellows is under the control of a microswitch 70 associated with each of the valves. The plurality of microswitches employed in connection with each of the four control means 53 are illustrated in connection with FIGS. 9–10 and constitute a sensing means for detecting a change in frame attitude with respect to the street surface on which the wheels travel.

Although other forms of sensing means may be employed, as illustrated in FIGS. 9 and 10, a gravity sensing device is employed which comprises a box 71 having miroswitches 70 in the respective corners thereof. A ball 72 is freely disposed within the box so as to roll in a concave bottom surface in the direction of the lowest elevation or depression. For example, should the front right wheel encounter an incline or raised portion in the street's surface, the ball 72 will roll against the actuator of microswitch 70' which will effect actuation of the check valve associated with the control means for axle section 51 for the front right wheel. Similarly, when the rear right wheel encounters a rise in the street surface 16, the ball will roll against microswitch 70'' to actuate the check valve associated with the rear right wheel control means. This relationship is shown in FIG. 9. In FIG. 10, a similar situation is shown with the exception that the front and rear left wheels are illustrated as encountering depressions in the surface 16. The size of the box will determine the overall sensitivity of the sensing device. Preferably, each device is mounted on a universal support and includes a thread set screw for initially adjusting and locking to a starting setting. Consequently, both depressions and elevations in the street surface are detected and control signals provided to the control means of the self-leveling mechanism for increasing or reducting pressure in the associated bellows for a given wheel.

The self-leveling device, sensing device and axle construction described herein may be employed in other off-road vehicles which are intended to traverse a rough or irregular terrain. These latter elements may be installed in such a vehicle so that as the vehicle negotiates a sharp curve, for example, the elements will counter the effects of centrifugal force and urge the vehicle in the opposite direction to the applied load forces generated by the centrifugal force of the vehicle.

In view of the foregoing, it can be seen that the self-propelled extruder of the present invention provides a means for forming and installing a continuous strip of curbing with great economy and labor saving efficiency. A suitable building material is supplied to the extruder which forcibly urges discharge of the product in a predetermined shape or configuration conforming to the discharge orifice of the extruder. The extruded material is properly laid in place as the vehicle moves in a desired direction along the street. The building material is forcibly extruded by means of the piston and cylinder assemblage and the discharge of the extruder is maintained substantially level with respect to the street surface by the self-leveling mechanism under control of the sensing means which detects surface irregularities. By employing a pressurized pneumatic control means, the entire system is made mobile and the self-leveling mechanism is extremely sensitive to changes in the vehicle attitude.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A mobile extruder for dispensing a continuous strip of building product material along the edge of a street surface comprising:
    a wheeled frame movably supported on the street surface;
    an extruding mechanism mounted on said frame having a shaped discharge orifice in close proximity to the street surface at the rear end of the extruder;
    sensing means carried on said frame for detecting changes in the attitude thereof;
    self-leveling mechanism carried on said frame operably connected to each wheel thereof and to said sensing means for raising and lowering each of said wheels in response to detection of changes in frame attitude;
    said self-leveling mechanism including an axle section pivotally mounted with respect to said frame for rotatably carrying a selected one of said wheels;
    bellows means for normally balancing and stabilizing said axle section in a predetermined position;
    valve means operably coupled to said bellows means for selectively pressurizing and de-pressurizing said bellows means so as to pivot said axle action in a vertical plane;
    said self-leveling mechanism further including a housing for enclosing said bellows means associated with each of said axle sections;
    a flanged sleeve rotatably disposed about said axle section within said housing; and
    said bellows means comprising a pair of bellows separated by said axle section and having their opposing ends pivotally carried on said sleeve and their opposite ends pivotally coupled to said housing.

2. The invention as defined in claim 1 wherein said extruding mechanism includes:
    a compaction chamber;
    a discharge chamber in fluid communication with said compaction chamber and terminating in said discharge orifice; and
    means movably carried in said compaction chamber for forcibly moving the building product material through said compaction chamber into said discharge chamber.

3. The invention as defined in claim 2 wherein said movable means comprises a pneumatic piston and cylinder assemblage.

4. The invention as defined in claim 1 including
    a hopper carried on said compaction chamber and in communication therewith for introducing the building product material thereto; and
    close means for selectively closing said hopper from said compaction chamber to selectively interrupt the flow of the material into said compaction chamber.

5. The invention as defined in claim 1 wherein
    said sensing means includes switch means operably coupled to said valve means; and
    gravity means movable in response to change of frame attitude to selectively engage said switch means for effecting actuation of said valve means.

6. The invention as defined in claim 5 including guide means carried on said frame cantilevered outwardly and having its free end in vertical alignment with the edge of the street.

7. The invention as defined in claim 1 wherein said self-leveling mechanism further includes a pair of compression springs having their ends secured to said sleeve and said housing respectively.

8. The invention as defined in claim 7 including a universal joint rotatably disposed on said axle section and carried on a mount slidably disposed on said housing whereby said mount moves in a vertical direction in response to pivoting of said axle section.

References Cited

UNITED STATES PATENTS

| | | | |
|---|---|---|---|
| 1,990,798 | 2/1935 | Richter | 280—6X |
| 2,684,254 | 7/1954 | Goss | 280—6UX |
| 2,864,452 | 12/1958 | Guntert | 94—46X |
| 3,186,730 | 6/1965 | Angell | 280—6X |
| 3,363,524 | 1/1968 | Catenacci | 94—46 |
| 3,404,899 | 10/1968 | Vogel | 280—6 |
| 3,414,278 | 12/1968 | Schmid | 280—6 |
| 3,466,055 | 9/1969 | Keijzer | 280—6 |

JACOB L. NACKENOFF, Primary Examiner

U.S. Cl. X.R.

280—6